(12) United States Patent
Roozbeh et al.

(10) Patent No.: US 11,194,731 B2
(45) Date of Patent: Dec. 7, 2021

(54) MANAGING AVAILABILITY OF MEMORY PAGES

(71) Applicant: Telefonaktiebolaget LM Ericsson (publ), Stockholm (SE)

(72) Inventors: Amir Roozbeh, Kista (SE); Joao Monteiro Soares, Solna (SE); Daniel Turull, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/883,561

(22) Filed: May 26, 2020

(65) Prior Publication Data

US 2020/0285587 A1 Sep. 10, 2020

Related U.S. Application Data

(63) Continuation of application No. 15/772,898, filed as application No. PCT/SE2015/051297 on Dec. 2, 2015, now Pat. No. 10,713,175.

(51) Int. Cl.
| | |
|---|---|
| *G06F 12/10* | (2016.01) |
| *H04L 12/00* | (2006.01) |
| *G06F 11/20* | (2006.01) |
| *G06F 12/02* | (2006.01) |
| *G06F 11/00* | (2006.01) |
| *G06F 11/14* | (2006.01) |

(52) U.S. Cl.
CPC ............ *G06F 12/10* (2013.01); *G06F 11/008* (2013.01); *G06F 11/1448* (2013.01); *G06F 11/20* (2013.01); *G06F 12/023* (2013.01); *H04L 12/00* (2013.01); *G06F 2212/1044* (2013.01); *G06F 2212/657* (2013.01)

(58) Field of Classification Search
CPC .. G06F 12/10; G06F 2212/657; G06F 12/023; G06F 2212/1044; G06F 11/008; G06F 11/1448; G06F 11/20; H04L 12/00
USPC ........................................................ 711/206
See application file for complete search history.

(56) References Cited

U.S. PATENT DOCUMENTS

| | | | |
|---|---|---|---|
| 6,865,157 B1 | 3/2005 | Scott et al. | |
| 9,165,003 B1 | 10/2015 | Tammala et al. | |
| 2003/0023825 A1* | 1/2003 | Woo | ...................... G06F 12/023 711/170 |
| 2008/0126712 A1* | 5/2008 | Mizushima | ......... G06F 12/0246 711/141 |
| 2008/0229049 A1 | 9/2008 | Nanda et al. | |
| 2011/0022807 A1* | 1/2011 | Maeda | .................. G06F 3/0643 711/154 |
| 2012/0030406 A1 | 2/2012 | Chang et al. | |
| 2014/0068209 A1 | 3/2014 | Lim et al. | |

* cited by examiner

*Primary Examiner* — Hua J Song
(74) *Attorney, Agent, or Firm* — Coats & Bennett, PLLC

(57) ABSTRACT

To manage memory, a computer system, responsive to receiving a message indicating an availability of a memory page of the computer system, generates a mapping between a logical address of the memory page and at least two physical memory addresses at which respective copies of the memory page are available. The computer system provides one of the at least two physical memory addresses in response to a request for access to the memory page.

18 Claims, 4 Drawing Sheets

MANAGING AVAILABILITY OF MEMORY PAGES

RELATED APPLICATIONS

This application is a continuation of prior U.S. application Ser. No. 15/772,898, filed 2 May 2018, which was the National Stage of International Application PCT/SE2015/051297, filed 2 Dec. 2015, the entire disclosure of each of which is hereby incorporated by reference.

TECHNICAL FIELD

Embodiments herein relate to computer systems, such as data center systems. In particular, a method and a Memory Availability Managing Module for managing availability of memory pages are disclosed. A corresponding computer program and a carrier therefor are also disclosed.

BACKGROUND

A computer system manages multiple resources, such as computing power, network access and memory storage. The multiple resources are of course not flawless, in the sense that the multiple resources never fail or become inaccessible for some other reason, such as power failure, overload or the like. Therefore, it has become customary to duplicate the computer system.

In a known example, there is a first computer system that is actively used for managing a task. In addition thereto, a second computer system is ready to take over management of the task, when the first computer system fails. In this manner, the management of the task is made more reliable. According to this example, all components, such as processing units, memory units, network interfaces, etc., of the first computer system needs to be duplicated.

Disadvantageously, the entire computer system needs to be duplicated even if some of the components may be more prone to fail than other components.

Data center hardware architectures that differ significantly for the above mentioned computer systems are arising. These data center architectures, sometimes referred to as disaggregated hardware type of architectures, includes examples like the Intel Rack Scale architecture, HyperScale Datacenter Systems or the like. By combining the disaggregated hardware architecture with optical interconnect, traditional distance and capacity limitations of electrical connections are alleviated. This enables a more efficient pooling of resources, which is expected to have a positive impact on utilization and energy consumption. A disaggregated hardware system of this kind, thus, typically comprises multiple pools of computing resources, multiple pools of memory resources, etc. This is in contrast to conventional computer systems, in which the computer system is built up of computers, where each computer is a stand-alone fully working entity, such as a Personal Computer (PC) or the like. In detail, the stand-alone fully working entity includes a motherboard, hard drive, random access memory, network interface, one or more processors and the like.

In a particular example, memory pages are allocated in the multiple pools of memory in the disaggregated hardware system. A problem may thus be how to manage availability of the memory pages of the disaggregated hardware system in an efficient manner.

SUMMARY

An object may thus be to manage availability of memory pages of the disaggregated hardware system of the above mentioned kind.

According to an aspect, the object is achieved by a method, performed by a Memory Availability Managing Module, for managing availability of memory pages. The memory pages are comprised in a set of memory blades, wherein a hardware system comprises the set of memory blades and a set of computing pools. The set of memory blades and the set of computing pools are interconnected with each other. The set of computing pools comprises computing units, wherein at least one operating system executes on the hardware system. The Memory Availability Managing Module is independent of the operating system.

The Memory Availability Managing Module receives a message relating to allocation of at least one memory page of the memory pages to said at least one operating system. The message comprises an indication about availability for said at least one memory page.

Moreover, the Memory Availability Managing Module translates the indication about availability to a set of memory blade parameters. The set of memory blade parameters identifies at least one memory blade of the set of memory blades, wherein said at least one memory page is allocated to said at least one memory blade.

Next, the Memory Availability Managing Module generates, based on the set of memory blade parameters, address mapping information for said at least one memory page. The address mapping information includes a logical address of said at least one memory page mapped to at least two physical memory addresses of said at least one memory blade.

The Memory Availability Managing Module provides at least some of the address mapping information for use when access to said at least one memory page is requested. Said at least some of the address mapping information comprises one of said at least two physical memory addresses.

According to another aspect, the object is achieved by a Memory Availability Managing Module configured for managing availability of memory pages. The memory pages are comprised in a set of memory blades, wherein a hardware system comprises the set of memory blades and a set of computing pools. The set of memory blades and the set of computing pools are interconnected with each other. The set of computing pools comprises computing units, wherein at least one operating system executes on the hardware system. The Memory Availability Managing Module is independent of the operating system.

The Memory Availability Managing Module is configured for receiving a message relating to allocation of at least one memory page of the memory pages to said at least one operating system. The message comprises an indication about availability for said at least one memory page.

Moreover, the Memory Availability Managing Module is configured for translating the indication about availability to a set of memory blade parameters. The set of memory blade parameters identifies at least one memory blade of the set of memory blades, wherein said at least one memory page is allocated to said at least one memory blade.

Furthermore, the Memory Availability Managing Module is configured for generating, based on the set of memory blade parameters, address mapping information for said at least one memory page. The address mapping information includes a logical address of said at least one memory page mapped to at least two physical memory addresses of said at least one memory blade.

Additionally, the Memory Availability Managing Module is configured for providing the address mapping information for use when access to said at least one memory page is requested.

According to further aspects, the object is achieved by a computer program and a carrier therefor corresponding to the aspects above.

Thanks to that the message comprises an indication about availability for said at least one memory page, the Memory Availability Managing Module is made aware of requirement concerning availability for said at least one memory page. In order to apply the indication about availability, the Memory Availability Managing Module translates the indication to a set of memory blade parameter. The set of memory blade parameters may typically identify a subset of the set of memory blades. In one example, while noting that further examples will be given in the detailed description below, the indication may have a value of three, which may mean that three copies of said at least one memory page shall be allocated at three different memory blades. In this example, each memory blade parameter of the set of memory blade parameters identifies a respective memory blade among the set of memory blades.

Next, the Memory Availability Managing Module generates address mapping information based on the set of memory blade parameters, since the Memory Availability Managing Module may be aware of both logical addresses allocated to the operating system and physical addresses of the set of memory blades, which is managed by the Memory Availability Managing Module. Continuing, with the example above, the address mapping information may include the logical address for said at least one memory page mapped to three physical addresses, i.e. one physical address pertaining to a respective memory blade of the three different memory blades.

Subsequently, at least some of the address mapping information is provided e.g. to a Memory Address Translation Module or any other module that handles memory requests. Said at least some of the address mapping information comprises one of said at least two physical memory addresses. The memory requests may relate to allocation of memory pages.

An advantage is that reliability in terms of latency and/or fault tolerance is improved.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
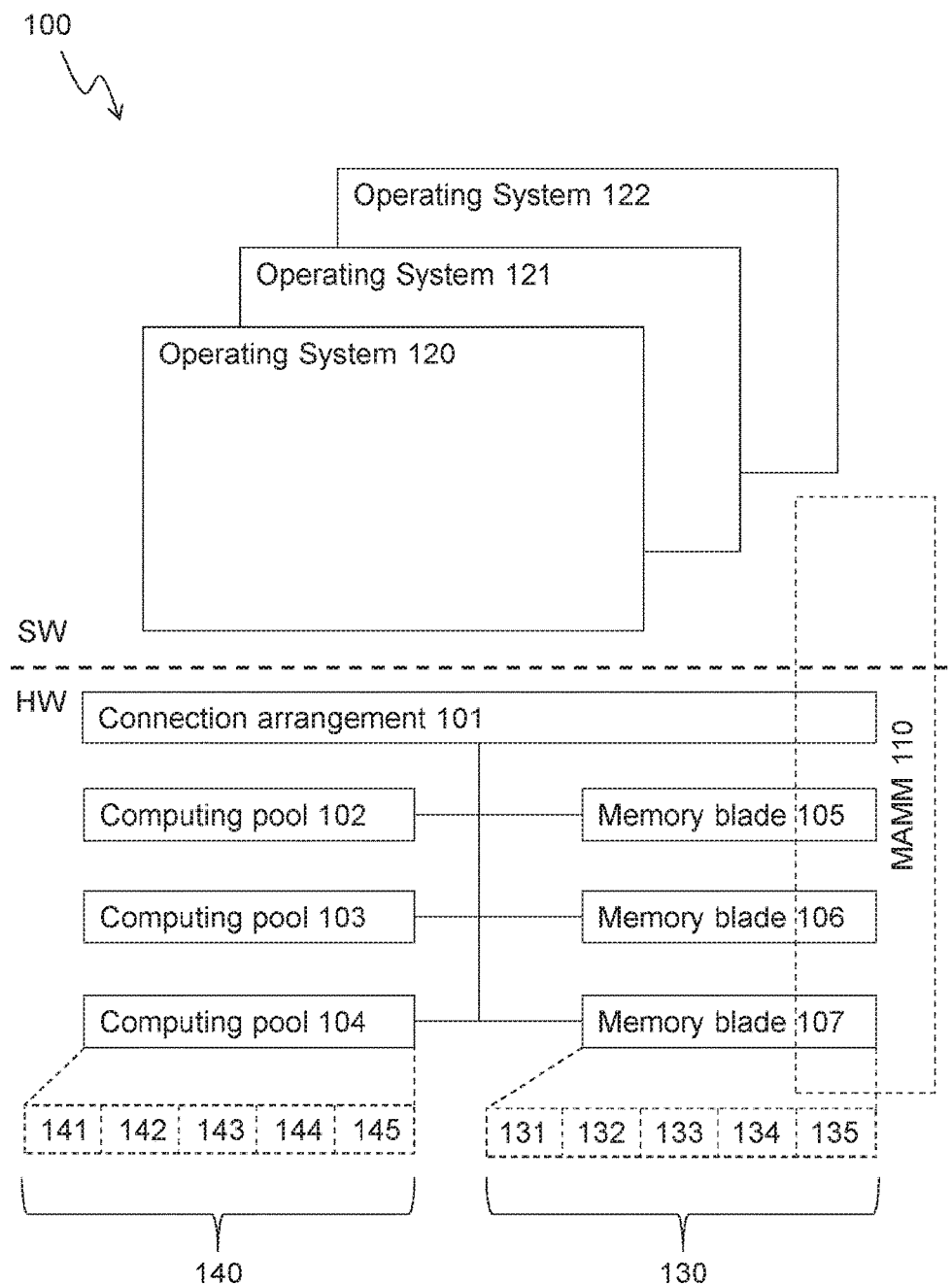
FIG. 1 is a schematic overview of an exemplifying computer system in which embodiments herein may be implemented.

Throughout the following description, similar reference numerals have been used to denote similar features, such as actions, steps, modules, circuits, parts, items elements, units or the like, when applicable. In the Figures, features that appear in some embodiments are indicated by dashed lines.

FIG. 1 depicts an exemplifying computer system 100 in which embodiments herein may be implemented. The computer system 100 is a hardware system, e.g. a disaggregated hardware system as disclosed in the background section.

Generally, the computer system 100 relies on a principle of hardware resource disaggregation. The principle of hardware disaggregation considers CPU, memory and network resources as individual and modular components. The resources are often organized in pools, i.e. there is a pool of CPU units, a pool of memory units, and a pool of network interfaces. When utilizing the computer system, a logical hardware machine may be composed of a sub-set of units/resources within one or more pools. In some examples, an Equipment Management Module (EMM) (not shown) may assemble the logical hardware machine by selecting the sub-set of resources within one or more pools. The term "logical hardware machine" may be used interchangeably with the term "virtual hardware machine" throughout this disclosure.

In more detail, the disaggregated hardware system 100 may comprise a connection arrangement 101 for interconnecting a set of computing pools 102, 103, 104 with a set of memory blades 105, 106, 107. The computing pools may also be referred to as computing blades. The connection arrangement 101 may be realized by optical fibers. Thus, a fast interconnection between the sets of computing and memory blades 102-107 is provided. Each memory blade of the set of memory blades 105, 106, 107 may be comprised in a rack of memory blades or the like. Sometimes, the term "sled" is used in instead of "blade". A rack refers to a closet, a cabinet or the like for housing some or all of the sets of computing and memory blades 102-107.

Moreover, the set of memory blades 105, 106, 107 may comprise one or more of:

a set of primary storage pools for use by the set of computing pools, a set of cache memory blades for use by the set of computing pools, a set of storage pools, and the like.

The set of primary storage pools may be realized in the form of so called cache memory(ies) and/or Random Access Memory(ies). The storage pools may include hard disc drives of various kinds, such as Solid State Drives, magnetic tape, conventional drives of various form factors (inches) and interfaces, such as Small Computer System Interface (SCSI), Integrated Drive Electronics/AT Attachment (IDE/ATA), Serial ATA (SATA), etc.

Each computing pool comprises a set of computing units 141, 142, 143, 144, 145. The sets of computing pools 102, 103, 104 may be realized in the form of one or more sleds, blades or assemblies of one or more computer racks (not shown). The sets of computing units 141, 142, 143, 144, 145 may comprise CPUs, Graphics Processing Units (GPUs), hardware implemented computing functions, etc. At least some computing pools 102, 103, 104 may lack at least one cache level, which in conventional computer systems typically is co-located i.e. placed on a Printed Circuit Board (PCB) together with the CPU(s). Cache levels are typically known as L1, L2 or L3 caches in the related literature. In some examples though, e.g. due to latency requirements, each computing pool may include any number of cache levels, which may or may not be backed up by one or more further levels of cache memory comprised in the set of memory blades 105, 106, 107 as mentioned above. In further examples, some computing pools 102, 103, 104 may comprise a first level of primary storage pools and a second level of primary storage pools may be comprised in the set of memory blades, where latency of the first level of primary pools typically is less than latency of the second level of primary pools. Thus, primary storage for the disaggregated hardware system, taken as a whole, is organized in an hierarchical manner spanning over both computing and memory blades. Generally, the disaggregated hardware system may comprise computing pools and memory blades, wherein the memory blades comprises at least some primary memory, e.g. the second level of primary storage pools, used by the set of computing pools.

Each memory blade comprises a set of memory units 131, 132, 133, 134, 135. The sets of memory blades 105, 106, 107 may be realized in the form of one or more sleds, blades or assemblies of one or more computer racks, the same, different or partially the same one(s) as compared the above mentioned racks for the computing pools. Each memory blade may preferably lack any substantial processing capabilities. Such substantial processing capabilities, or computing resources, is thus provided by means of the sets of computing pools 102, 103, 104.

In more detail, the memory units may be arranged on a memory board, as an example of memory blade, and the computing units 140 are arranged on a computing board, as an example of computing pool and/or computing blade. The memory board is different from the computing blade. This may mean that the memory blade is a Printed Circuit Board (PCB) that is separate from a further PCB at which the computing units may be mounted.

The memory board and the computing board are connected to the connection arrangement 101 to interconnect the set of memory blades 105, 106, 107 and the set of computing pools 102, 103, 104. The set of memory blades 105, 106, 107 are mountable, such as installable, in a first plurality of cabinets, while still being connected to the connection arrangement. The set of computing pools 102, 103, 104 are mountable in a second plurality of cabinets, wherein some, none or all of the cabinets of the first and second plurality of cabinets are different from each other. This means that in one exemplifying realization, there is provided at least one memory cabinet, comprising memory blades, and at least one computing cabinet, comprising computing pools. In another realization, there may be one or more cabinets, wherein at least some of said one or more cabinets comprises both memory blades and computing pools, and/or wherein at least some of said one or more cabinets comprises either memory blades or computing pools.

At the software side (SW), as opposed to the hardware (HW) side described above, one or more operating systems 120, 121, 122 may be executed on a respective logical hardware machine. This means that the computer system 100 hosts one or more operating systems 120, 121, 122. It shall here be said that a line between HW and SW is often somewhat fuzzy, since various programming languages enable implementation of a module both as hardware and software, also a Field Programmable Gate Array (FPGA) can be seen as a half-SW and half-HW component. As indicated above, the respective logical hardware machine may comprise a selected set of computing pools and a selected set of memory blades. The operating systems 120, 121, 122 may be referred to as virtual hosts, instances or the like, when executed by the computer system 100. Each operating system 120, 121, 122 may in its turn manage one or more instances of a software application, a virtual machine, database, a software library or the like. Accordingly, as used herein, the term "instance" may refer to an instance of a virtual host, an operating system, a software application, a virtual machine, a database, a software library or the like.

As used herein, the term "virtual address" has it conventional meaning, i.e. a software application is allocated to and uses virtual addresses. Each of the operating systems 120, 121, 122 manages mapping of virtual addresses to logical addresses. As an example discussing only one of the operating systems 120, 121, 122, this means that the operating system is executed on a logical hardware machine assembled at the disaggregated hardware system. Thus, the logical address may be indicated within a logical address space managed by the operating system. In this context, it may be noted that the operating system may be a conventional operating system, which thus is not aware of the logical address space made available by the disaggregated hardware system. Accordingly, from the perspective of the operating system, a logical address will be treated as if it is a physical address.

Furthermore, the term "logical address" may be indicated within a physical address space of the hardware system 100. This may mean that the hardware system 100, or rather a functional module thereof, assigns a set of logical addresses to be used by a certain operating system. The set of logical addresses is then mapped to physical addresses of the hardware system 100 as managed by the hardware system 100, such as the EMM, a Memory Address Translation Module (MATM) (not shown) or the like.

Now, in order to improve reliability for memory pages in the computer system 100, a Memory Availability Managing Module (MAMM) 110 is provided. The MAMM 110 may be implemented in SW, HW or partially HW and partially SW. Moreover, the MAMM 110 may be co-located with one or more of the memory blades 105, 106, 107 and/or the connection arrangement 101. The MAMM 110 may also be separate, e.g. located on a PCB that is separate from, the connection arrangement 101 and/or said one or more memory blades 105, 106, 107.

Figure 2:
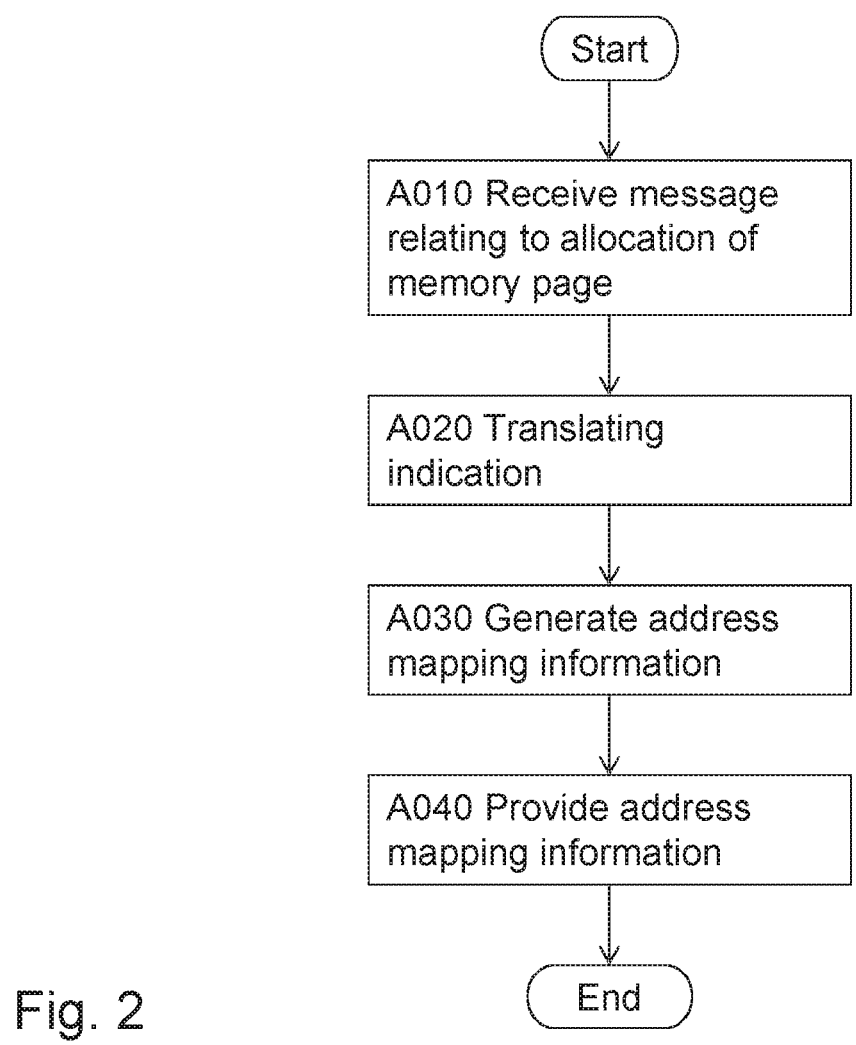
FIG. 2 is a flowchart illustrating embodiments of the method in the Memory Availability Management Module.

FIG. 2 illustrates an exemplifying method according to embodiments herein when implemented in the computer system 100 of FIG. 1. Hence, the MAMM 110 performs a method for managing availability of memory pages 130.

As mentioned above, the memory pages 130 are comprised in the set of memory blades 105, 106, 107, wherein the hardware system 100 comprises the set of memory blades 105, 106, 107 and the set of computing pools 102, 103, 104. The set of memory blades 105, 106, 107 and the set of computing pools 102, 103, 104 are interconnected with each other. The set of computing pools 102, 103, 104 comprises computing units 140, wherein at least one the operating system 120, 121, 122 executes on the hardware system 100. The MAMM 110 is independent of the operating system 120.

Thanks to that the MAMM 110 is independent of the operating system 120, the MAMM 110 may provide the improved reliability for any operating system 120 that is hosted by the hardware system 100. That is to say, the operating system 120 is provided as is, off-the-shelf, as a commodity product.

One or more of the following actions may be performed in any suitable order.

Initially, the operating system 120 may be about to be initialized on the computer system 100, i.e. a set of hardware resources are about to be assembled for use by the operating system 120. Alternatively, a change of availability of at least portions of memory used by the operating system 120 is about to be performed.

Action A010

The MAMM 110 receives a message relating to allocation of at least one memory page of the memory pages 130 to said at least one operating system 120. The message comprises an indication about availability for said at least one memory page.

In some examples, the message may be received from the MATM. In these examples, the message comprises information about a request for allocation of said at least one memory page, or more typically the message comprises the request for allocation of said at least one memory page. This will be explained in more detail with reference to FIG. 3 below.

In contrast to the preceding examples directly above, the message may be received from the EMM. The message may thus comprise a request for allocation of said at least one memory page, which typically happens when the EMM initializes the MAMM as will be explained in more detail with reference to FIG. 3 below.

The indication about availability may comprise a level of availability for each one of said at least one memory page.

There may be a respective level of availability for each memory page of said at least one memory page. This means that for one request various levels of availability may be requested for each memory page of said at least one memory page.

The levels of availability may be binary which means that there are only two levels, e.g. high or low availability, zero and one representing two different levels of availability, etc.

The level of availability typically represents a number of memory blades to which duplicates of said at least one memory page should be copied.

In further examples, the level of availability may represent one or more of:
a number of copies of said at least one memory page;
a number of memory pools for storing said at least one memory page;
a number of memory slots for storing said at least one memory page;
a maximum latency between said at least one memory page and a subset of the computing units 140, wherein the operating system 120 is executable on the subset of the computing units 140; and the like.

The number of copies of said at least one memory page may refer to that, when for example the indication has a value of four, the MAMM 110 will use four different physical addresses at which four copies of said at least one memory page will be maintained, e.g. stored.

The number of memory pools for storing said at least one memory page may refer to that, continuing with the example directly above, that said four copies will be allocated in two different memory pools, when the indication comprises a value of the number of memory pools that is equal to two.

The number of memory slots for storing said at least one memory page may refer to that, again continuing with the example above, that said four copies will be allocated in two different memory slots, when the indication comprises a value of the number of memory slots that is equal to two.

A difference between the two examples directly above may be that a power supply may be provided on a per memory pool basis. This means that, should the power supply fail, availability of said at least one memory page will be higher when the number of memory pools is equal to two as opposed to when the number of memory slots is equal to two. In this scenario, it is assumed that memory slots may share a common power supply, while it is guaranteed that the two memory pools—as in the first example of these two examples—have separate power supplies.

Another difference between the aforementioned two examples may relate to latency. In more detail, a difference in latency between two copies of said at least one memory page is expected to be less for two copies allocated to one memory pool and/or to one memory sled than for two copies allocated to different memory pools and/or different memory sleds.

Therefore, in some embodiments said at least one memory blade 105, 106, 107 may comprise at least two memory blades 105, 106, 107 in order to make duplicate copies of said at least one memory page dependent on reliability of a respective one of said at least two memory blades instead of reliability of merely one memory blade.

The maximum latency refers to that the indication may indicate a maximum allowable latency for the physical addresses relating to said at least one memory page. As an example, latency refers to time from requesting said at least one memory page to that said at least one memory page is available.

It deserves to be mentioned that, in some examples, the indication may directly be represented by one or more of:
a number of copies of said at least one memory page;
a number of memory pools for storing said at least one memory page;
a number of memory slots for storing said at least one memory page;
a maximum latency between said at least one memory page and a subset of the computing units 140, wherein the operating system 120 is executable on the subset of the computing units 140; and the like.

This means that the indication may be a set of numbers including one or more of the above mentioned examples. As an example, the indication may be given as (2, 3), which may mean that said at least one memory page should be stored as 3 copies on 2 different memory blades.

Action A020

Subsequent to action A010, the MAMM 110 translates the indication about availability to a set of memory blade parameters. The set of memory blade parameters identifies at least one memory blade 105, 106, 107 of the set of memory blades 105, 106, 107, wherein said at least one memory page is allocated to said at least one memory blade 105, 106, 107.

Said at least one memory blade 105, 106, 107 that is identified by the set of memory blade parameters may have been selected from among the set of memory blades based on reliability and/or availability measures of the set of memory blades. The reliability and/or availability measures are known to the MAMM 110. The MAMM 110 may for example be configured, e.g. by a user installing/mounting a particular memory blade, with information about the reliability and/or availability measures. The reliability and/or availability measures may for example be that the particular memory blade has a certain quality, has multiple power supplies or other property that the reliability and/or availability measures depend upon. It may for example be that the MAMM 110 selects said at least one memory blade for which some quality measure of the memory blade is higher than a threshold value. This means that the MAMM 110 may translate the indication to the set of memory blade parameters based on the reliability and/or availability measures of the set of memory blades. Hence, in some examples, the translation of the indication amounts to that the MAMM 110 selects, based on the indication and the reliability and/or availability measures, said at least one memory blade to which said at least one memory page will be allocated.

As mentioned above, the indication may refer to the various numbers representing memory pools, memory slots, duplicates or copies of said at least one memory page, etc. In some examples, the indication may be represented by a set of predefined values, e.g. 1, 2 and 3. In this manner, it will be simple enough to select the value of the indication to be included in the message above as compared to when the indication may be represented by the set of numbers as mentioned above.

It will then be a responsibility of the MAMM 110 to interpret the predefined value to determine the set of memory blade parameters to use when generating the address mapping information in action A030 below. For example when the predefined values are 1, 2 and 3 as above, and the set of memory blades includes 100 memory blades, then the value of 1 may mean that up to 3 different memory blades should be used, the value of 2 may mean that up to 6 different memory blades should be used and the value of 3 may mean that up to 9 different memory blades should be used. The number of different memory blades that should be used may be given as a percentage of a total number of memory blades of the disaggregated hardware system.

Action A030

The MAMM 110 generates, based on the set of memory blade parameters, address mapping information for said at least one memory page. The address mapping information includes a logical address of said at least one memory page mapped to at least two physical memory addresses of said at least one memory blade 105, 106, 107.

The generated address mapping information may comprise at least two physical addresses of only one memory blade 105, 106, 107. In this manner, the generated address mapping information may alleviate problems relating to latency and/or congestion while it is assumed that it is properties of the physical memory used for allocation of said at least two memory pages that contribute mostly to the latency and/or congestion, rather than the connection arrangement 101.

The set of memory blade parameters may identify at least two memory blades 105, 106, 107 of the set of memory blades 105, 106, 107, wherein the generated address mapping information may comprise at least two physical addresses relating to a respective one of said at least two memory blades 105, 106, 107. In this manner, a fault in one of said at least two memory blades does not compromise the availability of said at least one memory page, since e.g. if there are two copies of said at least memory page these copies will be allocated to different memory blades. Hence, it is ensured that a failure, or fault, in only one memory blade will not cause said at least one memory page to be inaccessible.

A fault, or failure, of a memory blade may relate to read and/or write errors caused by power loss, magnetic errors, soldering errors, imperfection of memory used in the memory blade, etc. The term "fault tolerance" initially mentioned relates to these kinds of errors or the like.

It shall here be said that in some examples, action A030 and A040 may be seen as one action, in which the MAMM 110 creates the address mapping information based on the indication while taking knowledge about the set of memory blades into account.

Action A040

Figure 3:
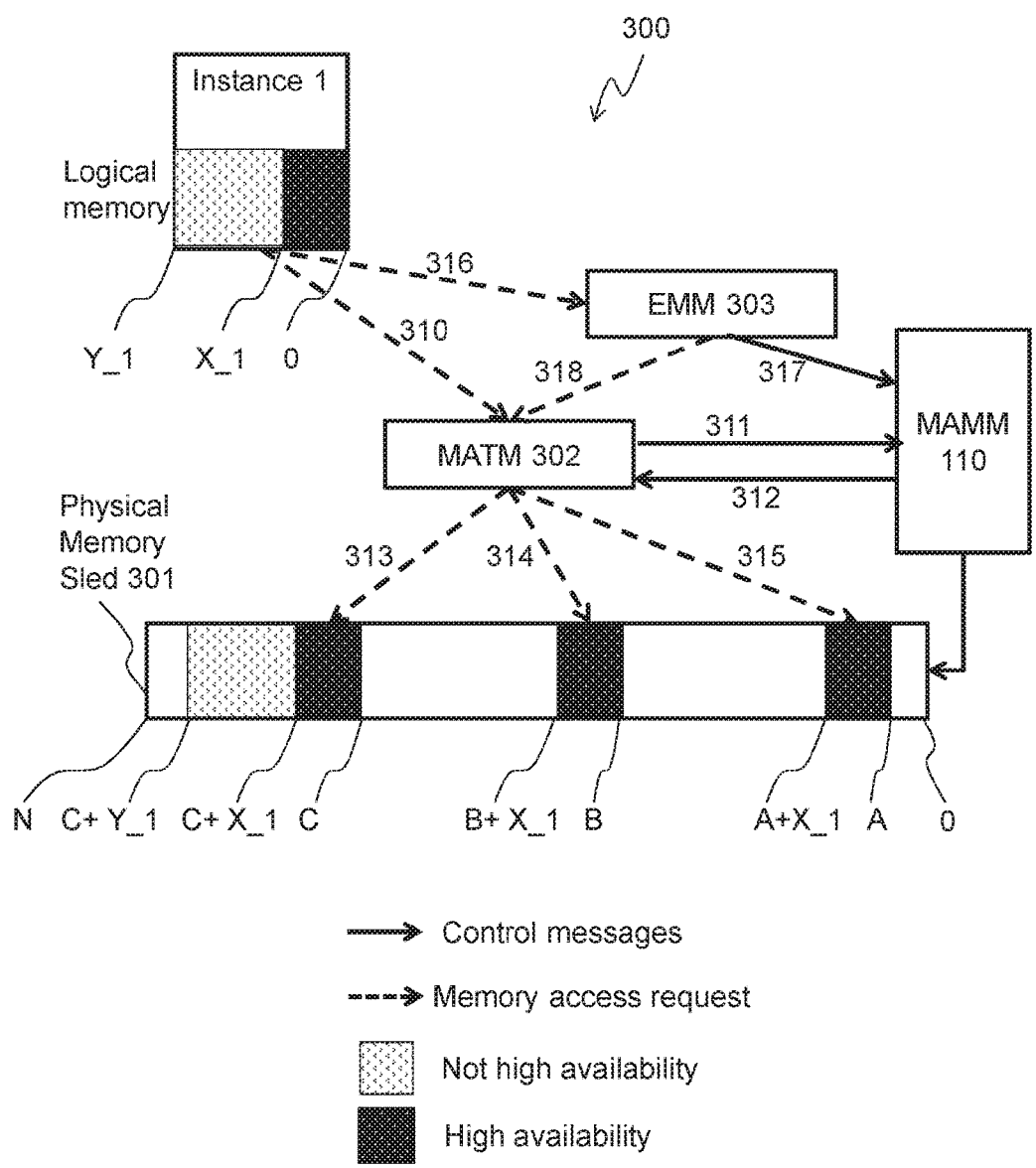
FIG. 3 is an exemplifying block diagram illustrating embodiments herein.

Now that the address mapping information is generated, the MAMM 110 provides at least some of the address mapping information for use when access to said at least one memory page is requested. Said at least some of the address mapping information comprises one of said at least two physical memory addresses. Typically, said at least some of the address mapping information is provided, e.g. sent, to the MATM as shown in FIG. 3 below. In some examples, the MAMM 110 provides some of the address mapping information to the EMM, which may forward said some of the address mapping information to the MATM.

Accordingly, the address mapping information may be provided by first providing, e.g. to the MATM, mapping of the logical address to one of said at least two physical addresses. Later, e.g. upon a failed access attempt at said one of said at least two physical addresses, the MAMM 110 may provide the address mapping information by providing mapping of the logical address to another one of said at least two physical addresses. The MAMM 110 may proceed in this manner until no further physical addresses—that have not failed—exists for the logical address. In some examples, a further physical address will be mapped to the logical address for each failed physical address. Thus, a probability for that it happens that no further physical address (that have not failed) exists is reduced significantly.

In further examples, the address mapping information, i.e. in its entirety, is provided, e.g. the MATM and/or the EMM.

FIG. 3 illustrates an exemplifying disaggregated hardware system 300, which resembles the computer system 100 of FIG. 1, albeit additional detail is provided here.

The disaggregated hardware system 300 comprises one or more physical memory sleds 301 (only one is shown in the Figure). A memory blade may typically be represented by one physical memory sled 301. The physical memory sled 301 comprises physical addresses ranging from 0 to N.

Furthermore, a Memory Address Translation Module (MATM) 302 is shown. The MATM 302 handles translation from logical addresses, known to an instance 1, to physical addresses, known the MATM 302 and the MAMM 110. The instance 1 may be an operating system, an application or the like. The instance 1 handles logical addresses ranging from 0 to Y_1.

Moreover, an Equipment Management Module (EMM) 303 is illustrated in FIG. 3. As an example, the EMM 303 may have provided the instance with high availability memory at logical addresses 0 to X_1 and not high availability memory at logical addresses X_1 to Y_1, but the instance is not aware of this. As illustrated in the Figure, different portions of the physical memory addresses are mapped to the logical memory addresses of the instance 1. Notably, logical addresses 0 to X_1 is mapped to three different ranges of physical addresses, i.e. A to A+X_1, B to B+X_1, and C to C+X_1.

The MAMM 110 may be comprised in the EMM 303 or the MATM 302, or the MAMM 110 may be separated from the EMM 303 and/or the MATM 302. Hence, in some examples the sending of messages and the like may be internal communication within a particular module.

Depending on realization various alternatives for handling the message of action A010 above are described in the following.

In a first example, the following actions may be performed.

Action 310

The MATM 302 receives from the instance 1 a request for allocation of said at least one memory page. This means that the message mentioned in action A010 of FIG. 2 comprises the request.

Action 311

Upon receiving the request, the MAIM 302 forwards the request, or at least information about the request, to the MAMM 110, in order to allow the MAMM 110 to translate the indication to a set of memory blade parameters.

Action 312

In response to action 311, the MAMM 110 sends to the MAIM 302 the address mapping information to be used by the MAIM 302. This action is similar to action A040 of FIG. 2. See action A030 for how the address mapping information is generated by the MAMM 110. Normally, only one of the physical addresses of the address mapping information is used at a time, but as briefly mentioned above two or more of said at least two physical addresses may be used at a time in order to reduce latency.

Action 312, 313, 314

Now the MAIM 302 is made aware of the address mapping information, the MAIM 302 may access and/or allocate said at least one memory page at—as mentioned above—at least one of said at least two physical addresses. Should access and/or allocation one of the two physical addresses fail 313, access and/or allocation will be attempted while using the other of said at least two physical addresses 314, 315. In this manner, increased availability of said at least one memory page is achieved. As a consequence, availability of the instance 1 is also increased.

In a second example, the following actions may be performed.

Action 316

The EMM 303 receives a request for allocation of said at least one memory page.

This means that the message mentioned in action A010 of FIG. 2 comprises the request. Any subsequent request for access to said at least one memory page may be directed directly to the MAIM 302, e.g. without passing the EMM 303.

Action 317

The MAMM 110 receives the request, or at least information about the request, from the EMM 303. The MAMM 110 will then perform actions A020 and A030 in order to be able to provide the address mapping information.

Action 312

In this example, action 312 allows the MAMM 110 to provide the address mapping information directly to the MAIM 302.

Action 318

In some example, the MAMM 110 sends the address mapping information to the EMM 303, which forwards the address mapping information to the MAIM 302. Thus, the MAIM 302 is configured with the address mapping information.

Figure 4:
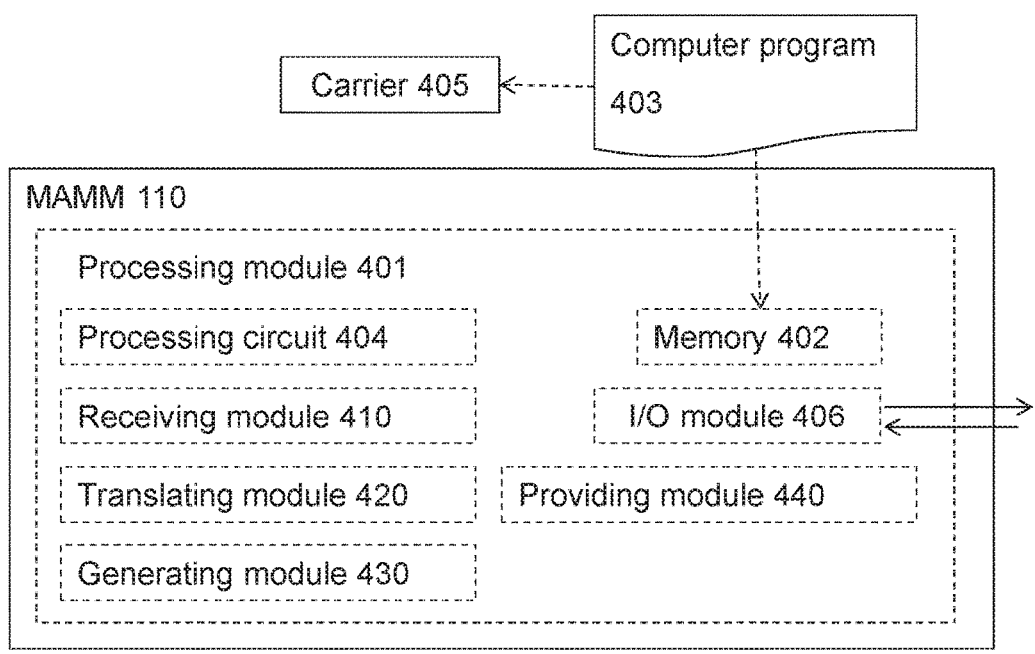
FIG. 4 is a block diagram illustrating embodiments of the Memory Availability Managing Module.

With reference to FIG. 4, a schematic block diagram of embodiments of the MAMM 110 of FIG. 1 is shown.

The MAMM 110 may comprise a processing module 401, such as a means for performing the methods described herein. The means may be embodied in the form of one or more hardware modules and/or one or more software modules The MAMM 110 may further comprise a memory 402. The memory may comprise, such as contain or store, a computer program 403.

According to some embodiments herein, the processing module 401 comprises, e.g. 'is embodied in the form of' or 'realized by', a processing circuit 404 as an exemplifying hardware module. In these embodiments, the memory 402 may comprise the computer program 403, comprising computer readable code units executable by the processing circuit 404, whereby the MAMM 110 is operative to perform the methods of FIG. 2.

In some other embodiments, the computer readable code units may cause the MAMM 110 to perform the method according to FIG. 2 when the computer readable code units are executed by the MAMM 110.

FIG. 4 further illustrates a carrier 405, or program carrier, which comprises the computer program 403 as described directly above.

In some embodiments, the processing module 401 comprises an Input/Output module 406, which may be exemplified by a receiving module and/or a sending module as described below when applicable.

In further embodiments, the processing module 401 may comprise one or more of a receiving module 410, a translating module 420, a generating module 430, and a providing module 440 as exemplifying hardware modules. In other examples, one or more of the aforementioned exemplifying hardware modules may be implemented as one or more software modules.

Accordingly, the MAMM 110 is configured for managing availability of memory pages 130.

As mentioned, the memory pages 130 are comprised in a set of memory blades 105, 106, 107, wherein a hardware system 100 comprises the set of memory blades 105, 106, 107 and a set of computing pools 102, 103, 104. The set of memory blades 105, 106, 107 and the set of computing pools 102, 103, 104 are interconnected with each other. The set of computing pools 102, 103, 104 comprises computing units 140, wherein at least one operating system 120 executes on the hardware system 100. The MAMM 110 is independent of the operating system 120.

Therefore, according to the various embodiments described above, the MAMM 110 and/or the processing module 401 and/or the receiving module 410 is configured for receiving a message relating to allocation of at least one memory page of the memory pages 130 to said at least one operating system 120. The message comprises an indication about availability for said at least one memory page.

Moreover, the MAMM 110 and/or the processing module 401 and/or the translating module 420 is configured for translating the indication about availability to a set of memory blade parameters. The set of memory blade parameters identifies at least one memory blade 105, 106, 107 of the set of memory blades 105, 106, 107, wherein said at least one memory page is allocated to said at least one memory blade 105, 106, 107.

Furthermore, the MAMM 110 and/or the processing module 401 and/or the generating module 430 is configured for generating, based on the set of memory blade parameters, address mapping information for said at least one memory page. The address mapping information includes a logical address of said at least one memory page mapped to at least two physical memory addresses of said at least one memory blade 105, 106, 107.

Additionally, the MAMM 110 and/or the processing module 401 and/or the providing module 440 is configured for providing at least some of the address mapping information for use when access to said at least one memory page is requested. Said at least some of the address mapping information comprises one of said at least two physical memory addresses.

The MAMM 110 and/or the processing module 401 and/or the receiving module 410 may be configured for receiving the message from a Memory Address Translation Module 302.

The MAMM 110 and/or the processing module 401 and/or the receiving module 410 may be configured for receiving the message from an Equipment Management Module 303.

The MAMM 110 and/or the processing module 401 and/or the providing module 440 may be configured for providing the address mapping information to the Memory Address Translation Module 302.

As mentioned above, said at least one memory blade 105, 106, 107 may comprise at least two memory blades 105, 106, 107.

The message may comprise a request for allocation of said at least one memory page.

The message may comprise information about a request for allocation of said at least one memory page.

The indication about availability may comprise a level of availability for each one of said at least one memory page.

The level of availability may represent one or more of:
a number of copies of said at least one memory page;
a number of memory pools for storing said at least one memory page;
a number of memory slots for storing said at least one memory page;
a maximum latency between said at least one memory page and a subset of the
computing units 140. The operating system 120 is executable on the subset of the computing units 140, or the like.

The set of memory blade parameters may identify at least two memory blades 105, 106, 107 of the set of memory blades 105, 106, 107. The generated address mapping information comprises at least two physical addresses relating to a respective one of said at least two memory blades 105, 106, 107.

The logical address may be indicated within a logical address space managed by the operating system 120.

The physical address may be indicated within a physical address space of the hardware system 100.

As used herein, the term "module" may refer to one or more functional modules, each of which may be implemented as one or more hardware modules and/or one or more software modules and/or a combined software/hardware module in one or more physical entities. In some examples, the module may represent a functional unit realized as software and/or hardware of said one or more physical entities.

As used herein, the term "program carrier", or "carrier", may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and decode the transmission. In case of group-casting, a group of specifically addressed devices may receive and decode the transmission.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

Even though embodiments of the various aspects have been described, many different alterations, modifications and the like thereof will become apparent for those skilled in the art. The described embodiments are therefore not intended to limit the scope of the present disclosure.

What is claimed is:

1. A method of memory management implemented by a computer system, the method comprising:
   receiving a message indicating an availability of a memory page of the computer system, wherein:
      the message comprises a request for allocation of one or more copies of the memory page; and
      the request for allocation indicates a number of memory pools or slots for storing the copies of the memory page;
   responsive to receiving the message, generating a mapping between a logical address of the memory page and at least two physical memory addresses at which respective copies of the memory page are available, wherein generating the mapping comprises allocating the one or more copies of the memory page requested for allocation to respective ones of the physical memory addresses such that:
      the respective copies of the memory page are available at the physical memory addresses; and
      the physical memory addresses are collectively located across the number of memory pools or slots indicated by the request for allocation;
   providing one of the at least two physical memory addresses in response to a request for access to the memory page.

2. The method of claim 1, wherein:
   the message further indicates how many of the copies of the memory page are available;
   generating the mapping between the logical address and the physical memory addresses comprises generating the mapping between the logical address and as many physical memory addresses as there are copies of the memory page indicated as available by the message.

3. The method of claim 1, wherein the request for allocation indicates the number of memory pools for storing the copies of the memory page, the memory pools having separate power supplies.

4. The method of claim 1, wherein the request for allocation indicates the number of memory slots for storing the copies of the memory page, the memory slots having a common power supply.

5. The method of claim 1, wherein:
   the request for allocation further indicates a maximum latency; and
   allocating such that the respective copies of the memory page are available at the physical memory addresses comprises allocating such that latency between at least one of the physical memory addresses and computing hardware executing an operating system is less than the maximum latency.

6. The method of claim 5, wherein allocating such that the respective copies of the memory page are available at the physical memory addresses comprises allocating such that latency between each of the physical memory addresses and the computing hardware executing the operating system is less than the maximum latency.

7. The method of claim 1, wherein providing the one of the at least two physical memory addresses comprises providing whichever of the at least two physical memory addresses has a lowest latency with respect to computing hardware executing an operating system.

8. A memory management device of a computer system, the memory management device comprising:
   processing circuitry and memory communicatively coupled to the processing circuitry, the memory comprising code executable by the processing circuitry whereby the processing circuitry is configured to:
      receive a message indicating an availability of a memory page of the computer system, wherein:
         the message comprises a request for allocation of one or more copies of the memory page; and
         the request for allocation indicates a number of memory pools or slots for storing the copies of the memory page;
      responsive to receiving the message, generate a mapping between a logical address of the memory page and at least two physical memory addresses at which respective copies of the memory page are available, wherein to generate the mapping the processing circuitry is configured to allocate the one or more copies of the memory page requested for allocation to respective ones of the physical memory addresses such that:
         the respective copies of the memory page are available at the physical memory addresses; and
         the physical memory addresses are collectively located across the number of memory pools or slots indicated by the request for allocation;
      provide one of the at least two physical memory addresses in response to a request for access to the memory page.

9. The memory management device of claim 8, wherein:
   the message further indicates how many of the copies of the memory page are available;
   to generate the mapping between the logical address and the physical memory addresses, the processing circuitry is configured to generate the mapping between the logical address and as many physical memory addresses as there are copies of the memory page indicated as available by the message.

10. The memory management device of claim 8, wherein the request for allocation indicates the number of memory pools for storing the copies of the memory page, the memory pools having separate power supplies.

11. The memory management device of claim 8, wherein the request for allocation indicates the number of memory slots for storing the copies of the memory page, the memory slots having a common power supply.

12. The memory management device of claim 8, wherein:
   the request for allocation further indicates a maximum latency; and
   to allocate such that the respective copies of the memory page are available at the physical memory addresses, the processing circuitry is configured to allocate such that latency between at least one of the physical memory addresses and computing hardware executing an operating system is less than the maximum latency.

13. The memory management device of claim 12, wherein to allocate such that the respective copies of the memory page are available at the physical memory addresses, the processing circuitry is further configured to allocate such that latency between each of the physical memory addresses and the computing hardware executing the operating system is less than the maximum latency.

14. The memory management device of claim 8, wherein to provide the one of the at least two physical memory addresses, the processing circuitry is configured to provide whichever of the at least two physical memory addresses has a lowest latency with respect to computing hardware executing an operating system.

15. A computer system comprising:
computing hardware configured to execute an operating system;
a plurality of memory pools that are distinct from the computing hardware and configured to store memory pages that are accessible to the operating system;
a memory management device communicatively coupled to the computing hardware and the memory pools, wherein the memory management device is configured to:
receive a message indicating an availability of a memory page of the computer system, wherein:
the message comprises a request for allocation of one or more copies of the memory page; and
the request for allocation indicates a number of memory pools or slots for storing the copies of the memory page;
responsive to receiving the message, generate a mapping between a logical address of the memory page and at least two physical memory addresses at which respective copies of the memory page are available, wherein to generate the mapping the memory management device is configured to allocate the one or more copies of the memory page requested for allocation to respective ones of the physical memory addresses such that:
the respective copies of the memory page are available at the physical memory addresses; and
the physical memory addresses are collectively located across the number of memory pools or slots indicated by the request for allocation;
provide one of the at least two physical memory addresses in response to a request for access to the memory page.

16. A method of memory management implemented by a computer system, the method comprising:
receiving a message indicating an availability of a memory page of the computer system, wherein:
the message comprises a request for allocation of one or more copies of the memory page; and
the request for allocation indicates a maximum latency;
responsive to receiving the message, generating a mapping between a logical address of the memory page and at least two physical memory addresses at which respective copies of the memory page are available, wherein generating the mapping comprises allocating the one or more copies of the memory page requested for allocation to respective ones of the physical memory addresses such that:
the respective copies of the memory page are available at the physical memory addresses; and
latency between at least one of the physical memory addresses and computing hardware executing an operating system is less than the maximum latency;
providing one of the at least two physical memory addresses in response to a request for access to the memory page.

17. A memory management device of a computer system, the memory management device comprising:
processing circuitry and memory communicatively coupled to the processing circuitry, the memory comprising code executable by the processing circuitry whereby the processing circuitry is configured to:
receive a message indicating an availability of a memory page of the computer system, wherein:
the message comprises a request for allocation of one or more copies of the memory page; and
the request for allocation indicates a maximum latency;
responsive to receiving the message, generate a mapping between a logical address of the memory page and at least two physical memory addresses at which respective copies of the memory page are available, wherein to generate the mapping the processing circuitry is configured to allocate the one or more copies of the memory page requested for allocation to respective ones of the physical memory addresses such that:
the respective copies of the memory page are available at the physical memory addresses; and
latency between at least one of the physical memory addresses and computing hardware executing an operating system is less than the maximum latency;
provide one of the at least two physical memory addresses in response to a request for access to the memory page.

18. A computer system comprising:
computing hardware configured to execute an operating system;
a plurality of memory pools that are distinct from the computing hardware and configured to store memory pages that are accessible to the operating system;
a memory management device communicatively coupled to the computing hardware and the memory pools, wherein the memory management device is configured to:
receive a message indicating an availability of a memory page of the computer system, wherein:
the message comprises a request for allocation of one or more copies of the memory page; and
the request for allocation indicates a maximum latency;
responsive to receiving the message, generate a mapping between a logical address of the memory page and at least two physical memory addresses at which respective copies of the memory page are available, wherein to generate the mapping the memory management device is configured to allocate the one or more copies of the memory page requested for allocation to respective ones of the physical memory addresses such that:
the respective copies of the memory page are available at the physical memory addresses; and
latency between at least one of the physical memory addresses and the computing hardware executing the operating system is less than the maximum latency;

provide one of the at least two physical memory addresses in response to a request for access to the memory page.

\* \* \* \* \*